(12) United States Patent
Moore

(10) Patent No.: US 12,723,670 B2
(45) Date of Patent: Sep. 1, 2026

(54) TIRE VALVE

(71) Applicant: THE LEGION ENGINEERING CORPORATION, Changhua City (TW)

(72) Inventor: Wayne-Ian Moore, Worcestershire (GB)

(73) Assignee: THE LEGION ENGINEERING CORPORATION, Changhua City (TW)

( * ) Notice: Subject to any disclaimer, the term of this patent is extended or adjusted under 35 U.S.C. 154(b) by 18 days.

(21) Appl. No.: 18/944,031

(22) Filed: Nov. 12, 2024

(65) Prior Publication Data

US 2026/0131603 A1 May 14, 2026

(51) Int. Cl.

*F16K 15/20* (2006.01)
*B60C 29/00* (2006.01)
*F16K 15/06* (2006.01)

(52) U.S. Cl.

CPC .......... *F16K 15/205* (2013.01); *F16K 15/063* (2013.01); *B60C 29/002* (2013.01)

(58) Field of Classification Search

CPC ..... B60C 29/002; B60C 29/02; F16K 15/205; F16K 15/063; F16L 37/35; F16L 37/42
See application file for complete search history.

(56) References Cited

U.S. PATENT DOCUMENTS 5,951,728 A * 9/1999 Hopson .............. B01D 46/0012 55/482
10,926,591 B2 * 2/2021 Courtney .............. B60C 29/062
12,092,231 B2 * 9/2024 Cox ...................... B60C 29/005
2017/0043636 A1 * 2/2017 Vettore ..................... B60C 5/22

* cited by examiner

*Primary Examiner* — Hailey K. Do

(74) *Attorney, Agent, or Firm* — MUNCY, GEISSLER, OLDS & LOWE, P.C.

(57) ABSTRACT

A tire valve is provided, wherein the tire valve includes: a tubular member including an inner surface, an internal channel and an enlarged section, the internal channel being defined by the inner surface and extending through the enlarged section; and a valve assembly including a sealing portion, movably inserted in the internal channel, and being operable to drive the sealing portion to engage with the inner surface to block the internal channel or disengage from the inner surface to unblock the internal channel; wherein when the tubular member is disposed through a rim, the enlarged section is inserted in an internal room of the rim, and a position where the sealing portion engages with the inner surface is located in the internal room of the rim.

9 Claims, 6 Drawing Sheets

TIRE VALVE

BACKGROUND OF THE INVENTION

Field of the Invention

The present invention relates to a device for inflation/deflation, particularly to a tire valve.

Description of the Prior Art

A tire valve is installed on the rim and protrudes from the rim for inflation or deflation. Conventional tire valves mainly include a valve stem installed in a valve seat, a valve pin is disposed within the valve stem to control the passage or blockage of air, thereby maintaining a required tire pressure.

A valve stem of a conventional tire valve includes an enlarged section which is designed to provide a larger air passage between a valve assembly and the enlarged section to achieve greater air flow. However, when a conventional tire valve is installed on a rim, the enlarged section of the valve stem is disposed through and beyond the rim. Additionally, a portion of the valve stem protruding from the rim also needs to include a section for connection to an inflating device. As a result, the conventional valve stem have a significant axial dimension, which greatly increases the overall length of the conventional tire valve, making it prone to damage and breakage under external forces.

The present invention is, therefore, arisen to obviate or at least mitigate the above-mentioned disadvantages.

SUMMARY OF THE INVENTION

The main object of the present invention is to provide a tire valve which has a short length and reduces the risk of damage and breakage due to external forces.

To achieve the above and other objects, a tire valve is provided, wherein the tire valve includes: a tubular member including an inner surface, an internal channel and an enlarged section, the internal channel being defined by the inner surface and extending through the enlarged section; and a valve assembly including a sealing portion, movably inserted in the internal channel, and being operable to drive the sealing portion to engage with the inner surface to block the internal channel or disengage from the inner surface to unblock the internal channel; wherein when the tubular member is disposed through a rim, the enlarged section is inserted in an internal room of the rim, and a position where the sealing portion engages with the inner surface is located in the internal room of the rim.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
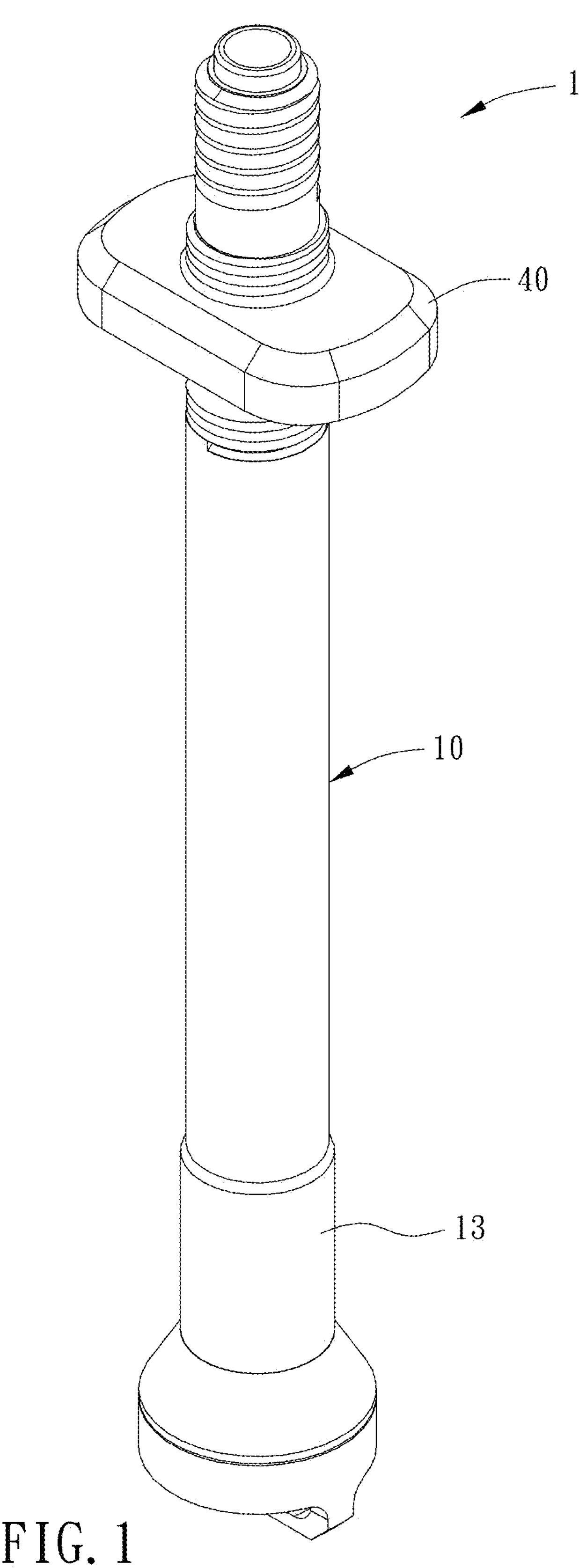
FIG. 1 is a perspective view of an exemplary embodiment of the present invention.
Figure 2:
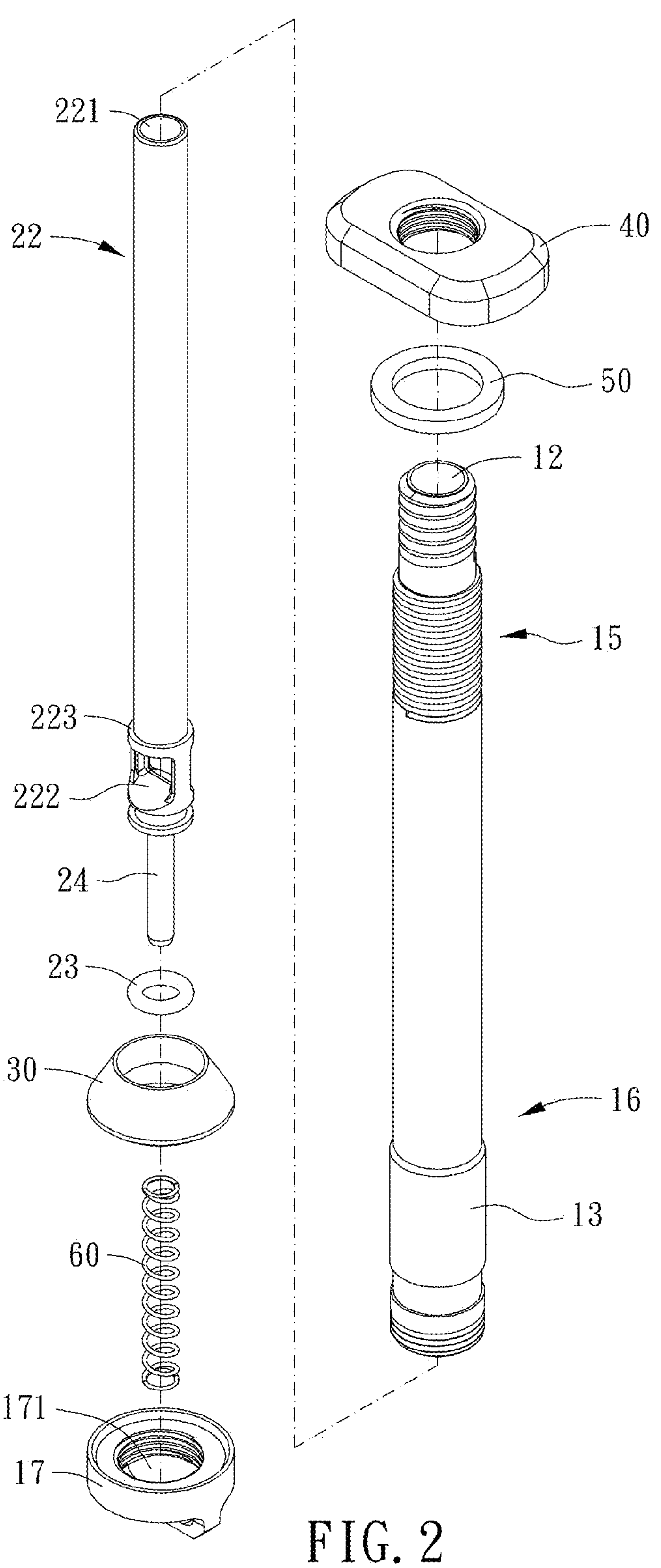
FIG. 2 is an exploded view of an exemplary embodiment of the present invention.
Figure 3:
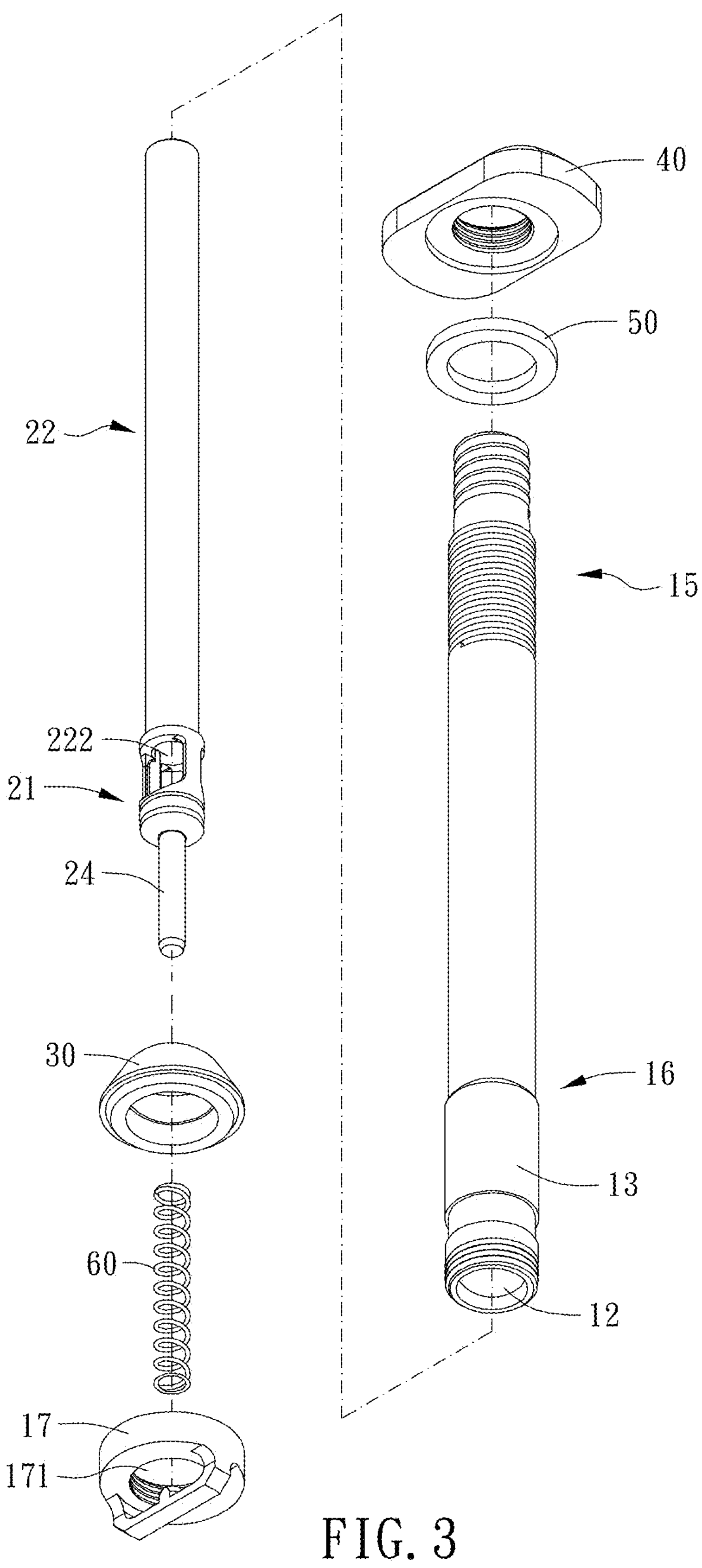
FIG. 3 is another exploded view of an exemplary embodiment of the present invention.
Figure 4:
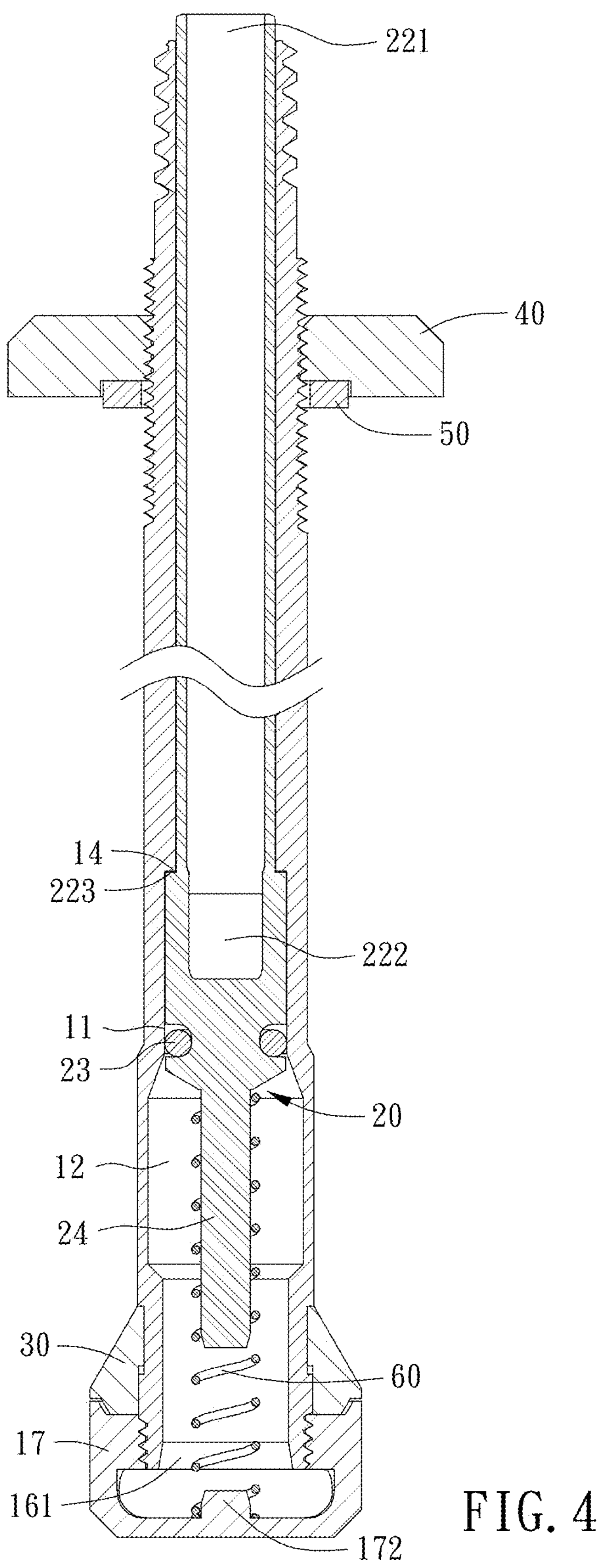
FIGS. 4 to 5 are cross-sectional views of an exemplary embodiment of the present invention.
Figure 5:
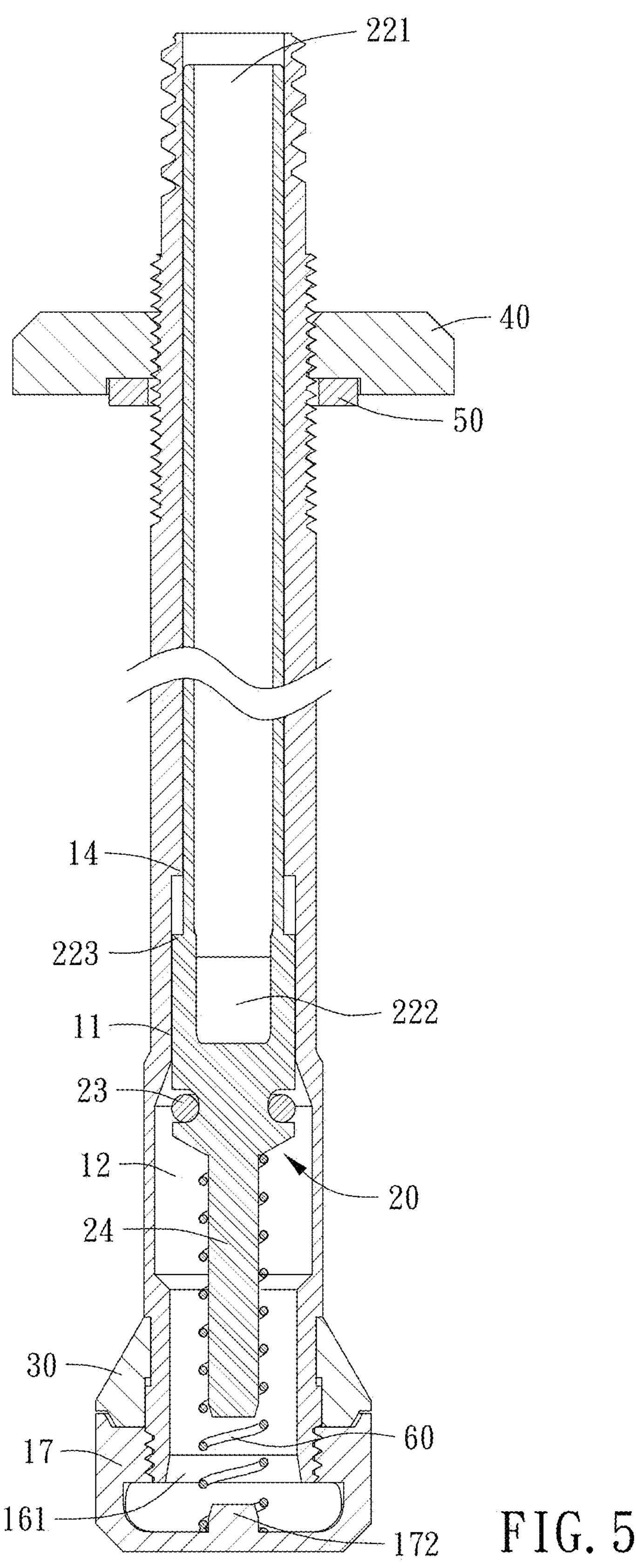
Figure 6:
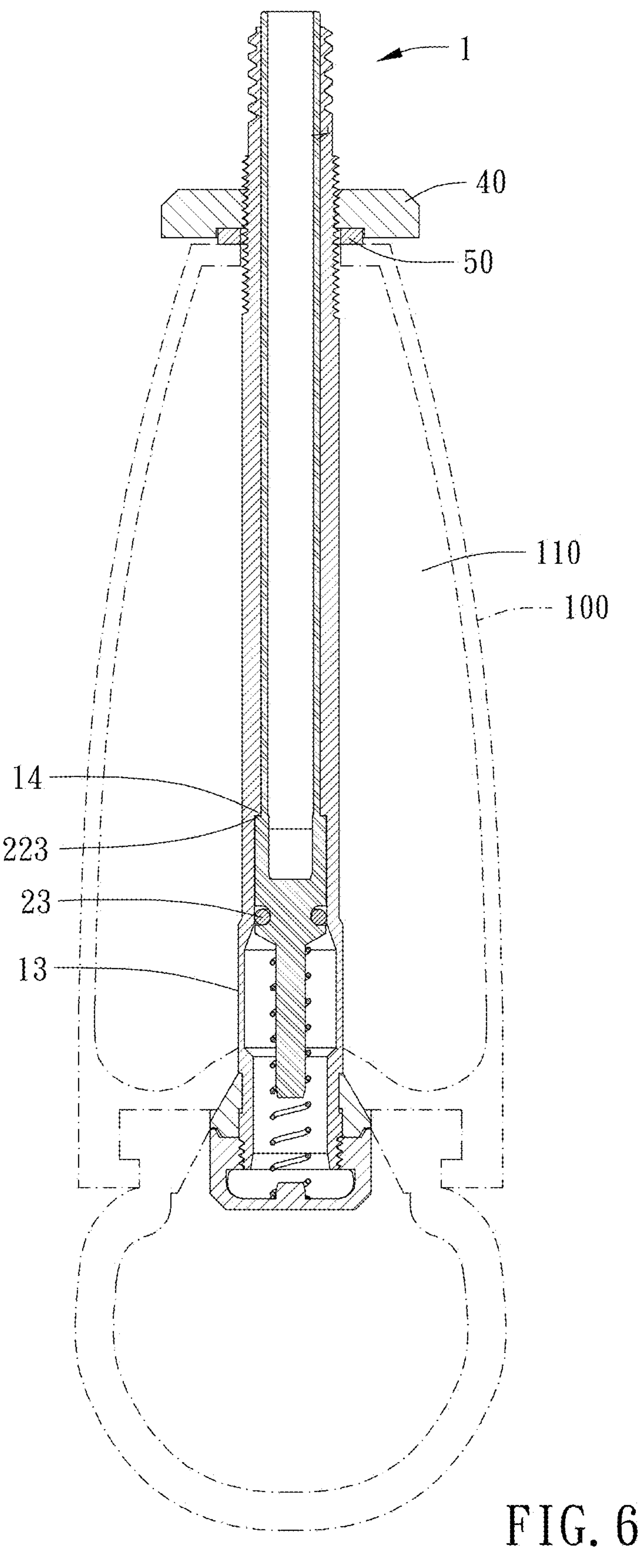
FIG. 6 is a schematic view showing a tire valve assembled to a rim according to an exemplary embodiment of the present invention.

Please refer to FIGS. 1 to 6 for an exemplary embodiment of the present invention. A tire valve 1 of the present invention includes a tubular member 10 and a valve assembly 20. The tire valve 1 may be a Schrader valve, Presta valve, or English valve. The tubular member 10 may be integrally formed of one piece or a multi-piece assembly. In a possible embodiment, the tubular member may include a valve body and a valve stem, the valve body and the valve stem may be integrally formed of one piece, wherein the valve body is configured to be connected to a rim, and the valve stem is connected to the valve body and extends outward beyond the rim.

The tubular member 10 includes an inner surface 11, an internal channel 12, and an enlarged section 13. The internal channel 12 is defined by the inner surface 11 and extends through the enlarged section 13, wherein the enlarged section 13 provides a larger air passage between the valve assembly 20 and the enlarged section 13 to allow for greater air flow. The valve assembly 20 includes a sealing portion 21, and the valve assembly 20 is movably inserted in the internal channel 12. The valve assembly 20 is operable to drive the sealing portion 21 to engage with the inner surface 11 to block the internal channel 12 or disengage from the inner surface 11 to unblock the internal channel 12. When the tubular member 10 is disposed through a rim 100, the enlarged section 13 is inserted in an internal room 110 of the rim 100, and a position where the sealing portion 21 engages with the inner surface 11 is located in the internal room 110 of the rim 100. This eliminates the need for the enlarged section to be positioned outside the rim as in conventional tire valves, thus significantly reducing the overall length of the tire valve and reducing the risk of damage and breakage due to external forces.

The valve assembly 20 includes a valve pin 22, and the valve pin 22 includes an axial hole 221 and at least one lateral hole 222 in communication with the axial hole 221. The at least one lateral hole 222 is in communication with the internal channel 12. The tubular member 10 further includes a first shoulder 14 protruding from the inner surface 11, and the valve pin 22 further includes a second shoulder 223. The valve pin 22 is movable such that the second shoulder 223 is blocked by the first shoulder 14. When the second shoulder 223 is blocked by the first shoulder 14, the sealing portion 21 engages with the inner surface 11 to block the internal channel 12, ensuring that the sealing portion 21 properly and effectively engages with the inner surface 11. The sealing portion 21 may be a portion of the valve pin 22 or an additional sealing component installed on the valve pin 22. The valve assembly 20 may be stopped in such a manner that a portion of the valve pin 22 (such as an radially-enlarged flange under the additional sealing component installed on the valve pin 22) or the additional sealing component installed on the valve pin 22 is stopped on any portion of the inner surface 11 (such as a tapered surface of the enlarged section 13).

The tubular member 10 further includes an upper section 15 and a lower section 16. When the tubular member 10 is disposed through the rim 100, the upper section extends out of the rim 100 for connection to an inflating device, and the lower section 16 includes the enlarged section 13 and an air outlet 161. Preferably, the enlarged section 13 is located as close as possible to the air outlet 161, thereby minimizing the overall length of the tire valve.

In this exemplary embodiment, the tire valve 1 further includes a valve stem seal sleeved on an end portion of the tubular member 10. The valve stem seal 30 is configured to seal an assembling hole of the rim 100. The valve assembly 20 further includes a valve pin seal 23 sleeved on the valve pin 22, and the valve pin seal 23 is operable to engage with the inner surface 11 to block the internal channel 12. The valve pin 22 extends out beyond the tubular member 10 and can be pressed to activate and unblock the internal channel 12. A fastener 40 is screwed onto the tubular member 10, and a rim seal 50 is sleeved on the tubular member 10 and located between the enlarged section 13 and the fastener 40. The fastener 40 is configured to tighten the tubular member 10 and force the rim seal 50 tightly against an outer surface of the rim 100, ensuring a good air-tight effect.

An end cap 17 may be detachably connected to an end of the tubular member 10, facilitating easy installation and replacement. The end cap 17 includes at least one through hole 171 in communication with the internal channel 12, allowing for inflating and deflating operations. Preferably, the tire valve 1 further includes an elastic member 60 disposed between the valve assembly 20 and the end cap 17, ensuring that the valve assembly 20 normally blocks the internal channel 12. Specifically, the elastic member 60 is a coil spring, and the valve assembly 20 further includes a shaft member 24 (for example, the shaft member 24 may be a portion of the valve pin 22), and the end cap 17 further includes a projection 172. The elastic member 60 is sleeved on the shaft member 24 and the projection 172. Preferably, in an axial direction of the tubular member 10, the shaft member 24 has a length not less than a length of the enlarged section 13, thereby stabilizing the elastic member 60 and being conducive to stable operation of the valve assembly 20.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire valve including:

a tubular member including an inner surface, an internal channel and an enlarged section, the internal channel being defined by the inner surface and extending through the enlarged section; and a valve assembly including a sealing portion, movably inserted in the internal channel, and being operable to drive the sealing portion to engage with the inner surface to block the internal channel or disengage from the inner surface to unblock the internal channel;

wherein when the tubular member is disposed through a rim, the enlarged section is inserted in an internal room of the rim, and a position where the sealing portion engages with the inner surface is located in the internal room of the rim;

wherein an end cap is detachably connected to an end of the tubular member, and the end cap includes at least one through hole in communication with the internal channel.

2. The tire valve of claim 1, wherein the tubular member further includes an upper section and a lower section, and when the tubular member is disposed through the rim, the upper section extends out of the rim for connection to an inflating device, and the lower section includes the enlarged section and an air outlet.

3. The tire valve of claim 1, further including an elastic member, wherein the elastic member is disposed between the valve assembly and the end cap.

4. The tire valve of claim 3, wherein the elastic member is a coil spring, the valve assembly further includes a shaft member, the end cap includes a projection, and the elastic member is sleeved on the shaft member and the projection.

5. The tire valve of claim 4, wherein in an axial direction of the tubular member, the shaft member has a length not less than a length of the enlarged section.

6. The tire valve of claim 1, wherein the valve assembly includes a valve pin, the valve pin includes an axial hole and at least one lateral hole in communication with the axial hole, and the at least one lateral hole is in communication with the internal channel.

7. The tire valve of claim 6, wherein the tubular member further includes a first shoulder on the inner surface, the valve pin further includes a second shoulder, and the valve pin is movable so that the second shoulder is blocked by the first shoulder.

8. The tire valve of claim 7, wherein when the second shoulder is blocked by the first shoulder, the sealing portion engages with the inner surface to block the internal channel.

9. The tire valve of claim 8, further including a valve stem seal, wherein the valve stem seal is sleeved on an end portion of the tubular member; the valve assembly further includes a valve pin seal sleeved on the valve pin, and the valve pin seal is operable to engage with the inner surface to block the internal channel; the valve pin extends out beyond the tubular member; a fastener is screwed onto the tubular member; a rim seal is sleeved on the tubular member and located between the enlarged section and the fastener, the fastener is configured to tighten the tubular member and force the rim seal tightly against an outer surface of the rim.

* * * * *